US011235250B2

(12) United States Patent
Yuan

(10) Patent No.: US 11,235,250 B2
(45) Date of Patent: Feb. 1, 2022

(54) CUSTOMIZABLE, ADAPTABLE, MULTIUSER COMPUTER-BASED ROLE-PLAYING METHOD AND APPARATUS THEREFOR

(71) Applicant: Ryan Luencheen Yuan, Arcadia, CA (US)

(72) Inventor: Ryan Luencheen Yuan, Arcadia, CA (US)

( * ) Notice: Subject to any disclaimer, the term of this patent is extended or adjusted under 35 U.S.C. 154(b) by 0 days.

(21) Appl. No.: 16/880,925

(22) Filed: May 21, 2020

(65) Prior Publication Data

US 2020/0282317 A1 Sep. 10, 2020

Related U.S. Application Data

(63) Continuation of application No. 16/013,831, filed on Jun. 20, 2018, now Pat. No. 10,702,781, which is a
(Continued)

(51) Int. Cl.
*A63F 13/55* (2014.01)
*A63F 13/822* (2014.01)
(Continued)

(52) U.S. Cl.
CPC .......... *A63F 13/822* (2014.09); *A63F 13/211* (2014.09); *A63F 13/213* (2014.09);
(Continued)

(58) Field of Classification Search
CPC .......... A63F 13/10; A63F 13/12; A63F 13/25; A63F 13/30–32; A63F 13/35; A63F 13/50; A63F 13/55
See application file for complete search history.

(56) References Cited

U.S. PATENT DOCUMENTS 7,788,323 B2    8/2010 Greenstein et al.
7,794,315 B2    9/2010 Sakaguchi et al.
(Continued)

OTHER PUBLICATIONS

Wiederhold, et al., An Investigation into Physiological Responses in Virtual Environments: An Objective Measurement of Presence, 2001, 2002, 2004, pp. 175-184.
(Continued)

*Primary Examiner* — Omkar A Deodhar
(74) *Attorney, Agent, or Firm* — WHGC, P.L.C.; John F. O'Rourke; Alexander R. Schlee

(57) ABSTRACT

Game client, game server, Web application server, and database server including database with data representative of a virtual world. Game client or server, or both, includes motifs, motif manager, character manager, scenes-a-faire manager, and display manager coupled to display, all in communication with game manager, and pseudorandomizer, which can instigate changing of a motif. Motifs are representative of a game character or environment. A user interface has mass sensor, accelerometer, haptic device, first device for visual input, output, or both, second device for audio input, output, or both, and tactile sensor, effector or both. Included may be automatic translator, or TTS/STT module. The online game can be virtual world representative of at least two of a northern continent, a western continent, a southern continent, a central continent, and an eastern continent. Methods provide game client, game server, and a database that manipulate character or environment motifs and scenes-a-faire.

11 Claims, 5 Drawing Sheets

Related U.S. Application Data continuation of application No. 15/451,890, filed on Mar. 7, 2017, now Pat. No. 10,022,633, which is a continuation of application No. 15/001,159, filed on Jan. 19, 2016, now Pat. No. 9,586,146, which is a continuation of application No. 14/333,402, filed on Jul. 16, 2014, now Pat. No. 9,278,285, which is a continuation of application No. 13/725,636, filed on Dec. 21, 2012, now Pat. No. 8,876,611, which is a continuation of application No. 13/239,217, filed on Sep. 21, 2011, now Pat. No. 8,366,554.

(51) Int. Cl.

| | | |
|---|---|---|
| A63F 13/47 | (2014.01) | |
| A63F 13/211 | (2014.01) | |
| A63F 13/215 | (2014.01) | |
| A63F 13/424 | (2014.01) | |
| A63F 13/352 | (2014.01) | |
| A63F 13/285 | (2014.01) | |
| A63F 13/213 | (2014.01) | |
| G06F 40/40 | (2020.01) | |
| G06F 40/58 | (2020.01) | |
| G06F 1/3206 | (2019.01) | |
| G06F 1/3296 | (2019.01) | |
| G07F 17/32 | (2006.01) | |
| A63F 13/30 | (2014.01) | |
| A63F 13/31 | (2014.01) | |
| A63F 13/23 | (2014.01) | |
| A63F 13/52 | (2014.01) | |
| G10L 15/02 | (2006.01) | |
| G10L 13/08 | (2013.01) | |
| G10L 15/22 | (2006.01) | |
| G10L 15/26 | (2006.01) | |
| G10L 15/30 | (2013.01) | |
| A63F 13/60 | (2014.01) | |

(52) U.S. Cl.
CPC ............ *A63F 13/215* (2014.09); *A63F 13/23* (2014.09); *A63F 13/285* (2014.09); *A63F 13/30* (2014.09); *A63F 13/31* (2014.09); *A63F 13/352* (2014.09); *A63F 13/424* (2014.09); *A63F 13/47* (2014.09); *A63F 13/52* (2014.09); *G06F 1/3206* (2013.01); *G06F 1/3296* (2013.01); *G06F 40/40* (2020.01); *G06F 40/58* (2020.01); *G07F 17/3225* (2013.01); *G10L 13/08* (2013.01); *G10L 15/02* (2013.01); *G10L 15/22* (2013.01); *G10L 15/26* (2013.01); *G10L 15/30* (2013.01); *A63F 13/60* (2014.09); *A63F 2300/105* (2013.01); *A63F 2300/1037* (2013.01); *A63F 2300/1081* (2013.01); *A63F 2300/407* (2013.01); *A63F 2300/513* (2013.01); *A63F 2300/5553* (2013.01); *A63F 2300/6009* (2013.01); *A63F 2300/609* (2013.01); *A63F 2300/6072* (2013.01); *A63F 2300/6081* (2013.01); *A63F 2300/632* (2013.01); *A63F 2300/807* (2013.01); *G10L 2015/223* (2013.01); *Y02D 10/00* (2018.01)

(56) References Cited

U.S. PATENT DOCUMENTS

2010/0216553 A1   8/2010   Chudley et al.
2010/0227688 A1*  9/2010   Lee .................... A63F 13/60
                                                463/31

OTHER PUBLICATIONS

Zhao, "Being there" and the Role of Presence Technology, 2003.
Zhao, Toward A Taxonomy of Copresence.
Azuma, A Survey of Augmented Reality, Aug. 1997.
Tychsen, et al., Personalizing the Player Experience in MMORPGs, 2006.
Biocca, et al., Towards A More Robust Theory and Measure of Social Presence: Review and Suggested Criteria, 2003.
Yee, The Demographics, Motivations and Derived Experiences of Users of Massively Multi-User Online Graphical Environments, 2006.
Assiotis, et al., A Distributed Architecture for MMORPG, 2006.
Lubliner, et al., N2 Heads are Better than One: Collaborative Learning, Utilizing an Integrated Knowledge Repository, Facilitated Through a Massively Multiplayer Online Gaming (MMOG) Paradigm, 2008.
Caltagirone, et al., Architecture for a Massively Multiplayer Online Role Playing Game Engine.
Wilcox, et al., Personal Space In Virtual Reality.
Bonk, et al., Massive Multiplayer Online Gaming: A Research Framework for Military Training and Education, Mar. 2005.
Feng, et al., A Long-Term Study of a Popular MMORPG.
Fox, et al., Virtual Reality, A Survival Guide for the Social Scientist.
Bateman, et al., The Neurobiology of Play.
Copier, Connecting Worlds. Fantasy Role-Playing Games, Ritual Acts and the Magic Circle.
Drennan, et al., Virtual Consumption: Using Player Types to Explore Virtual Consumer Behavior, 2007.
Parsons, An examination of massively multiplayer online role-playing games as a facilitator of internet addition, 2005.
Hyun Sung Chu, A simple, elegant implementation that delivers the functionality needed by any MMO game, 2008.
Hyun Sung Chu, Gaming and Web integration. 2008.
Hyun Sung Chu, Capabilities and limitations, 2009.
Assiotis, et al., A Distributed Architecture for Massive Multiplayer Online Role-Playing Games, 2005.
Slater, et al., The Influence of Body Movement on Subjective Presence in Virtual Environments.
Leppalahti, About the Community of Role-Players.
Yee, Motivations for Play in Online Games.
Fritsch, et al., The Effect of Latency and Network Limitations on MMORPG's.
Harris, et al., The Evolution of Social Behavior over Time in Second Life, 2009.
Kim, et al., HYMS: A Hybrid MMOG Server Architecture, 2004.
Nahrstedt, Lecture 39—Hot Topics in Multimedia, 2009.
Lambeth, Nationalism, Nationhood and Identity in Virtual Worlds and MMORPGs.
Fron, et al., The Hegemony of Play, 2007.
Dedual, Haptics: An Introduction, 2007.
Plimpton, Information and Intelleigent Systems: Advancing Human-Centered Computing, Information Integration and Informatics, and Robust Intelligence, 2007.
Top 25 Downloads, All Users Presence: Teleoperators & Virtual Environments, 2007.
Witmer, et al., Measuring Presence in Virtual Environments: A Presence Questionnaire.
Marchionini, Synthesis Lectures on Information Concepts, Retrieval, and Services.
Fan, et al., Build A Social Game In 3 days, Make an MMORPG on a Social Network, Chromacoders.org, 2009.
Tsetserukou, et al., ExoInterfaces: Novel Exosceleton Haptic Interfaces for Virtual Reality, Augmented Sport and Rehabilitation, 2010.
Liyanage, et al., A New Persistence and Communication Architecture for MMOG/DVE.

* cited by examiner

CUSTOMIZABLE, ADAPTABLE, MULTIUSER COMPUTER-BASED ROLE-PLAYING METHOD AND APPARATUS THEREFOR

CROSS-REFERENCE TO RELATED APPLICATION

This Application is a continuation of co-pending U.S. patent application Ser. No. 16/013,831, entitled "CUSTOMIZABLE. ADAPTABLE, MULTIUSER COMPUTER-BASED ROLE-PLAYING METHOD AND APPARATUS THEREFOR, filed Jun. 20, 2018, which is a continuation of U.S. patent application Ser. No. 15/451,890, entitled "CUSTOMIZABLE. ADAPTABLE, MULTIUSER COMPUTER-BASED ROLE-PLAYING METHOD AND APPARATUS THEREFOR," filed Mar. 7, 2017, issuing as U.S. Pat. No. 10,022,633, on Jul. 27, 2018, which is a continuation of U.S. patent application Ser. No. 15/001,159, entitled "CUSTOMIZABLE. ADAPTABLE, MULTIUSER COMPUTER-BASED ROLE-PLAYING METHOD AND APPARATUS THEREFOR," filed Jan. 19, 2016, issuing as U.S. Pat. No. 9,586,146 on Mar. 7, 2017, which is a continuation of U.S. patent application Ser. No. 14/333,402, now U.S. Pat. No. 9,278,285, filed on 16 Jul. 2014 and issued on Mar. 8, 2016, entitled "CUSTOMIZABLE, ADAPTABLE. MULTIUSER COMPUTER-BASED ROLE-PLAYING METHOD AND APPARATUS THEREFOR," which is a continuation of U.S. patent application Ser. No. 13/725,636, now U.S. Pat. No. 8,876,611, filed on 21 Dec. 2012 and issued 4 Nov. 2014, entitled "CUSTOMIZABLE, ADAPTABLE. MULTIUSER COMPUTER-BASED ROLE-PLAYING METHOD AND APPARATUS THEREFOR." which is a continuation of U.S. patent application Ser. No. 13/239,217, now U.S. Pat. No. 8,366,554, filed on 21 Sep. 2011 and issued 5 Feb. 2013, entitled "CUSTOMIZABLE. ADAPTABLE, MULTIUSER COMPUTER-BASED ROLE-PLAYING METHOD AND APPARATUS THEREFOR," all of which are relied upon for priority and all of which are incorporated by reference herein in their entirety.

BACKGROUND OF THE INVENTION

1. Field of the Invention

The present invention relates to computer operations, in particular, to interactive computer gaming, and most particularly, to a massively multiplayer online computer based role-playing game.

2. Background of the Art

A computer-based role playing game (cRPG) may be characterized by creation of an artificial model, such as a simulated society, which is constituted of a set of roles and rules to be performed by human users, alone or in conjunction with a computer. The latter model often is called a computer role playing game (cRPG), which have been in existence since the early days of timeshare computing and, certainly, before the advent of window-oriented graphical user interface environments. In a typical RPG, each (physical) RPG user manipulates at least one (virtual) player to enact behaviors in a simulated society in accordance with a set of behavioral rules and consequences with a goal of reaching a prescribed end. Two or more RPG users can enact distinct actions, responses, and counter-responses to match wits in achieving an end of the RPG. RPG players may be hostile, cooperative, or collaborative relative to each other, and player transactions may be parallel or interactive in nature.

In general, a cRPG can be seen as an object including plural entities such as, without limitation, players, functional operatives, scenes-a-faire, habitats, habitations, habiliments, armamentaria, flora, fauna, and environments. These entities may respond to each other with behavior patterns, typically corresponding to the provided roles and rules of the cRPG, along with an allowed range or type of player behaviors, which may be scripted, spontaneous or both. cRPG players can be a human user or a "bot," that is an executing agent of the computer employing, for example, artificial intelligence or a programmed finite state machine.

Frequently, entities such as players, habitats, habitations, habiliments, armamentaria, flora, fauna, and environments may be selected from preset formats. Some cRPGs permit limited modifications to selected entities, rules, roles, behaviors, and preset formats.

However, cRPGs generally are not configured to allow a cRPG user to modify players, functional operatives, scenes-a-faire, habitats, habitations, habiliments, armamentaria, flora, fauna, environments, geospatial configurations (e.g., terrain, topography), temporospatial relationships, ambient weather conditions, rules, roles, formats, and corresponding behaviors and reactions of players to such modifications. In addition, cRPGs typically do not provide a mechanism by which players adapt their behavior and intermediate goals realistically, responsive to a modification, or a mechanism by which spontaneous character or environmental behavior may change.

SUMMARY OF THE EMBODIMENTS

The present invention includes embodiments of apparatus and methods of a massively multiplayer online game. The online game apparatus is characterized by program code embodied on a medium and capable of causing a computing platform to execute the program code to realize a client, or a server, or both, as well as the activity of a virtual world. An online game can include a game client; a game server coupled to the game client; a Web application server coupled to the game server; and a database server coupled to the Web application server. The database server includes a database with data representative of a virtual world. In certain embodiments, the game client or the game server includes a plurality of motifs, a multidimensional motif manager, an avatar-character manager, a scenes-a-faire manager, and a multidimensional display manager coupled to a computer role playing game display, all in communication with a computer role playing game manager, and a pseudorandomizer. The plurality of motifs are representative of a game character. An avatar is emblematic of the game character. The database manager is coupled to the virtual world in which the character is displayed, wherein the pseudorandomizer instigates a change in a preselected motif. In certain other embodiments, the online game includes the game client and the game server having the pseudorandomizer, the plurality of motifs, the multidimensional motif manager, the avatar-character manager, the scenes-a-faire manager, and the multidimensional display manager coupled to a computer role playing game display, all in communication with the computer role playing game manager, and the Web application server wherein the pseudorandomizer instigates a change in a preselected motif. The apparatus of the game can have a user interface having at least one of a mass sensor, an accelerometer, a haptic device, a first device for visual input or visual output, or both, a second device for audio input or audio output, or both, and a tactile sensor or a tactile effector or both. The apparatus further can include an automatic translator to a predetermined language, coupled to the computer role playing game manager. Another feature of an apparatus can be one of a text-to-speech module or a speech-to-text module, coupled to the computer role playing game manager. The online game can be a virtual world representative of at least two of a northern continent, a western continent, a southern continent, a central continent, and an eastern continent. In selected embodiments of the MMORPGS, the game character reacts adaptively to at least one environmental motif. Selected other embodiments of the game apparatus may have plural game clients, plural game servers selectively coupled to the plural game clients; and plural Web application servers selectively coupled to the plural game clients and plural game servers.

Also included in the embodiments of the invention are a method of operating an online game, including providing a game client; and in the game client: selecting a game to be played, selecting a character for the game, selecting a virtual era for the game, selecting a virtual environment for the game, selecting virtual scenes-a-faire for the era, selecting at least two motifs for the character, selecting at least two motifs for the virtual environment, and selecting at least two motifs for the virtual scenes-a-faire. The method continues by initializing an instantiation of the game in the game client, the character and the corresponding at least two motifs thereof, the virtual era, the virtual environment and the corresponding at least two motifs thereof, and the scenes-a-faire and the corresponding at least two motifs thereof; and playing the selected game thereof in the game client, wherein the game is a massively multiplayer role-playing online game. In some embodiments, the method also may include at least one of: modifying the character, modifying the environment, modifying the era, or modifying the scenes-a-faire of the online game. The method may include modifying the game after selecting the game. An online game method embodiments can include coupling a game server to the game client such that the instantiation joins a virtual world hosted on the game server; and coupling a database having data pertaining to the state of the virtual world to the game server and to the game client. Some embodiments of the method of the game include the character adapting a selected motif advantageously. Other embodiments of the method of the game include the character having a behavior; and the character adapting a behavior advantageously.

BRIEF DESCRIPTION OF THE DRAWINGS

The invention is generally shown by way of reference to the accompanying drawings in which.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

DETAILED DESCRIPTION OF THE EMBODIMENTS

Massive multiplayer online (MMO) games are Internet-based video games (cRPG) that can accommodate hundreds—or even thousands—of concurrent users. A defining characteristic of most multiplayer online games is that they present a single, integrated, persistent gaming world. A role-playing game (RPG or cRPG) may be characterized by the creation of an artificial model, such as a simulated society, which is constituted of a set of roles and rules to be performed by human users, alone and in conjunction with a computer. A massively multiplayer online role playing game system (MMORPGS) can accommodate many players each choosing a character of different factions, genders, races, classes, professions, missions or goals, and experience levels. In a virtual world of a MMORPGS, a player character can be graphically represented by an avatar, or graphical proxy. MMORPGS also can have non-player characters (NPCs) including animal representations, fantastical creature representations, computer system maintenance personnel, virtual world functionaries, a game master (GM), and many other interactive elements, as can be selected and modified by the MMORPGS herein. Elements of the MMORPGS of the present invention may be implemented in hardware, in software, in firmware, or in a combination of at least two of hardware, software, or firmware. In software, each element constitutes a module of computer-executable code that when executed, performs that functions of the corresponding module. For convenience, some modules may have many implementations, which cooperatively execute with respect to at least one other module, in order to effect the desired virtual feature or function.

Figure 1:
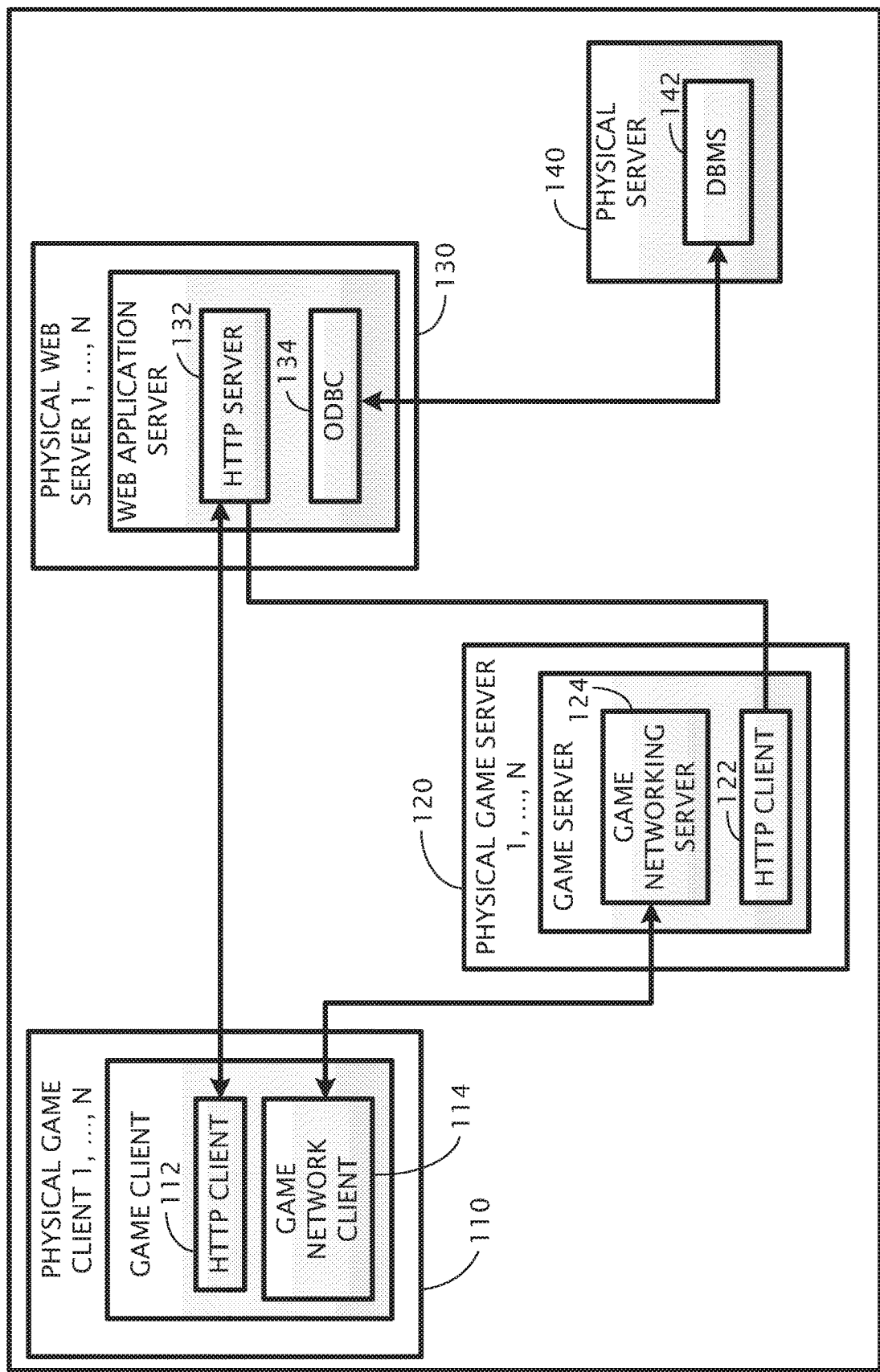
FIG. 1 is a generalized block diagram of a computing platform architecture of an embodiment in accordance with the teachings of the present invention.

In general, and turning to FIG. 1, a MMORPGS 100 structured of the fundamental elements is shown. As used herein, it is assumed that at least one virtual server is represented by a physical server, although it is well-known that a physical server may represent multiple virtual servers. A MMORPG system (MMORPGS) may include four basic hardware components on which the MMORPG software is hosted: (1) a game client 110, to render the game for the user; (2) at least one game server 120 to interact with the gaming client; (3) a Web application server 130 to integrate with the gaming servers and clients; and (4) a database server 140 to persist and retrieve data. Of course, more than one of each server may be used to facilitate wide-scale use, many motifs, and complex play. Each game client 110 may include HTTP client 112 coupled to HTTP server 132 of web application server 130, and an respective game networking client 114 coupled to a corresponding at least one game networking server 124. Game server 120 also includes an HTTP client 122 coupled to HTTP server 132 of web application server 130. Web application server 130 also includes open database connectivity interface (ODBC) 134 which is in communication with a database management system (DBMS) 142 hosted by database server 140. DBMS 142 maintains data which can be representative of at least one state of the MMORPG.

A gaming client platform is not limited to one brand or type of gaming platform, but may be represented by any computing platform capable of receiving commands and displaying a field of play. Of course, additional, interactive, haptic, and audiovisual elements may be added by a player as allowed by the base gaming client. Gaming loads may be balanced among cooperating servers, and players, tasks, or portions of the virtual world may be divided among cooperating servers. Also, the virtual world represented by the MMORPGS may be logically divided into adjacent cells, similar to familiar mobile phone cells facilitating character migration and regional hand-off, to facilitate a player moving of a corresponding character about the virtual world. In addition, depending upon the number of persons participating in the MMORPG, it may be useful to divide the virtual world into redundant zones or shards by providing zoned game servers, and auxiliary, coupled web servers to maintain play, flexibility, and persistence.

Figure 2:
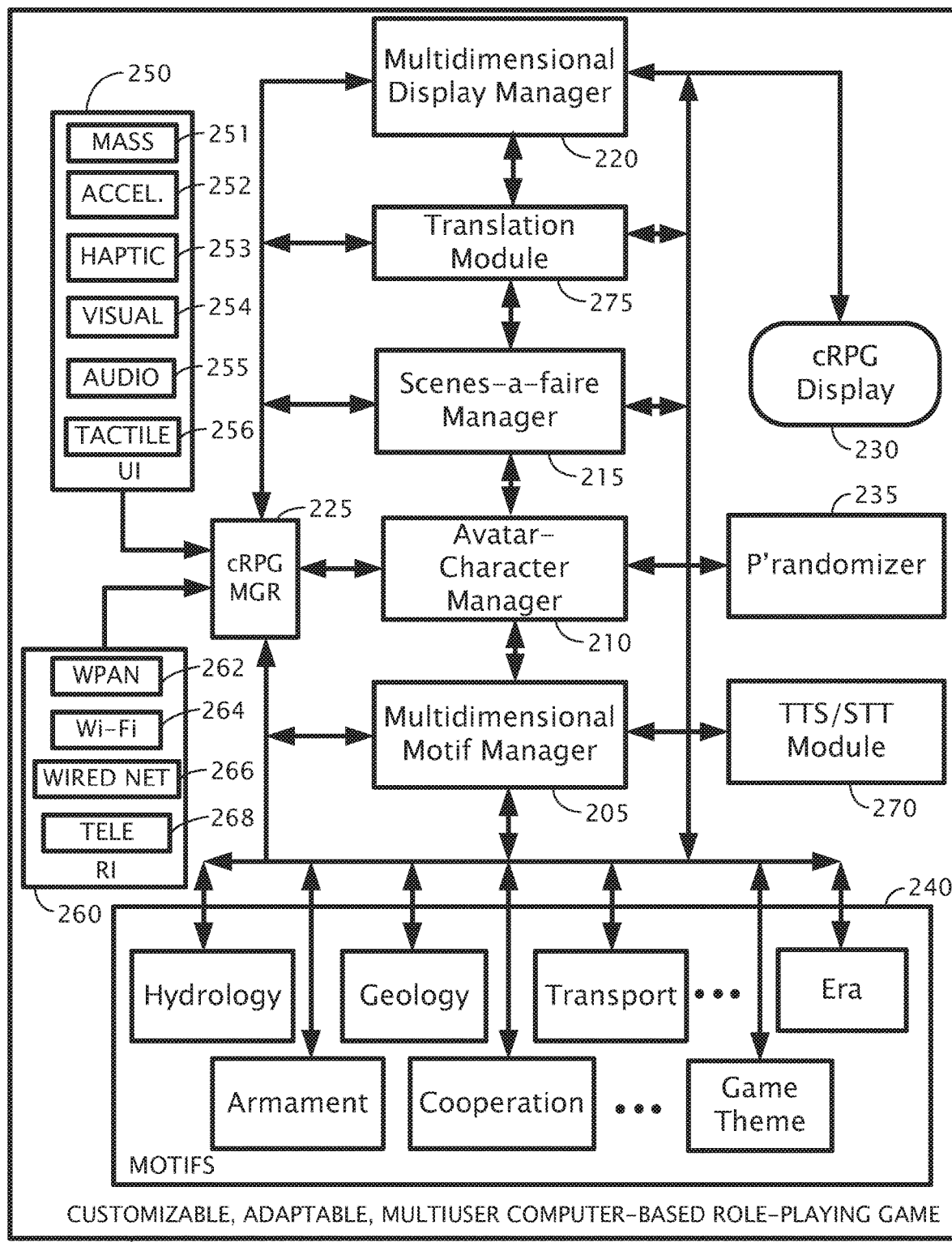
FIG. 2 is a generalized functional module architecture of an online game in accordance with the teachings of the present invention.

Turning to FIG. 2 and given the aforementioned examples, MMORPGS 200 can include a multiple dimension motif manager 205 which can be used to manipulate one or more motifs 240 or portion thereof. MMORPGS 200 also may include avatar-character manager 210, scenes-a-faire manager 215, multidimensional display manager 220, cRPG manager 225, cRPG display 230, pseudorandomizer 235, user interface 250 and remote interface 260, all coupled functionally together. In general, these constituents are manipulable by a Game Master, administrator or other MMORPGS manager. Pseudorandomizer 235 can instigate a change in character or environmental motif, for example, to cause a change of character behavior or to cause a blizzard. User input into system 200 may be by way of user interface 250 or remote interface 260. Examples of subsystems which may be used for user input via interface 250 are mass sensor 251, X-Y or X-Y-Z accelerometer 252, haptic subsystem 253, visual input (e.g., a camera with recognition) 254, audio input (e.g., voice commands) 255, and tactile subsystem (including buttons, levers, and joysticks) 256. Mass sensor 251 can sense mass-related actions (weight-shifting, jumping, punching), accelerometer 252 may be used for force, tilt, impact, gyration, navigation, and other temporospatial moves by players during game progress. Haptic subsystem 253 can provide sensory feedback from the game in a manner that simulates real force (dragging, lifting, grabbing, squeezing, thumping), movement (response to impact from other characters), thermal (warm/cool), hand control, and other human-oriented feedback. Audio input/output 254 can be by way of microphone array or single microphone (or speaker array/single speaker, or both microphone and speaker), with the former simplifying tracking of speech during user movement. Visual input/output 255 also may be by way of one or more cameras which may operate over different visual frequency ranges.

Remote interface 260 can include a WPAN network link 262, such as Bluetooth® or ZigBee® personal area networks; a WiFi® network link 264 (IEEE 802.11 or 802.16 or both); a wired network link 266, for example, a cable modem link; or a telephonic interface 268 which may be an HPNA, DSL-type or voice-grade telephonic link. Remote-type interfaces 260 may include, without limitation WPAN (e.g., Bluetooth®) network connection 262, an wide or intermediate range wireless network 264 (represented by "Wi-Fi"®), wired network connections 266 (e.g., 10 GbE) and telephonic-type lines 268. The use of UI 250 and RI 260 may be distinct or may form part of an interactive dialogue of action, sound, and multimedia experience system.

In addition, teleoperation may be accomplished using, for example, haptic subsystem 253, visual input/output 254, tactile subsystem 256, and remote network interface 260. One example of teleoperation may be grabbing an opponent character, or repairing armament, with the cRPG display 230 providing satisfactory visual feedback to the user. Also, cRPG display 230 may be of high definition and be capable of multi-screen display, showing the point of view of the character, a widescope overhead view, a map view, and an infrared sensor view. MMORPGS 200 can be implemented in a game client, a game server or both. Moreover, each client or server may be virtual and be hosted on a physical machine with many other respective clients or servers. It is contemplated that, at least, multiple physical client systems will be interconnected in an embodiment of MMORPGS 200, and that one or many physical server systems (e.g., game networking, Web application, or database) also may be interconnected thereto.

cRPG manager 225 can be constituted one or more CPUs, GPUs, or MMUs functioning cooperatively to facilitate the dimensions of gameplay. As used herein, the term "dimension" is not used merely to describe a length, height, or width, but may describe any facet of a motif, including without limitation, color, heat, temporal location, or altitude. In addition, a scenes-a-faire manager 215 may be coupled interactively to multiple dimensional motif manager 205, allowing scenes-a-faire to be manipulated and customized by multiple dimensional motif manager 205. Typically, scenes-a-faire can be a motif such as a stock layout, geophysical backdrop, an iconic element, a treatment, an expression, a character, a place, a story element, a virtual language, or another expected feature, which typically may accompany an era, a portion of the world, a game story theme, or character-types associated with the corresponding cRPG (MMORPG). A motif can be an instantiated programming element realized within a server; a motif can be a non-exclusive characteristic of a player character, a non-player character, or an environmental feature. Each motif 240 may interact with one or more other motifs 240. With the assistance of multiple dimensional motif manager 205, a player can create a plurality of predetermined or custom motifs 240, in advance of play or on-the-fly, during play. The motifs 240 may form a representation of an activity or a physical feature, and a motif 240 may be a manipulable dimension having a selectable characteristic, attribute, ambience, action, or interaction. That is, although predetermined at first, each motif 240 may be selectable, manipulable, or customizable, allowing game players to create a dynamic role playing game experience with customized avatars having realistic, fantastical, or combination responses to their virtual environment. Avatar manager 210 may be implemented such that avatar-related motifs, including character type (faction, race, class), physical features, habiliment, armament, or other features of a virtual player may be predetermined or customized. Coupled with multiple dimensional motif manager 205 and avatar manager 210 can be a multidimension display manager 220, which is configured to display at least one motif on cRPG display 230. In some embodiments, it can be desirable to include at least one pseudorandomizer 235, which may be used to introduce a predetermined degree of instability or perturbations into the behavior of one or more motifs. Embodiments herein also may include a cRPG manager 225, which may be used by a player to manipulate number of players, a game element, a character, a level of difficulty, a speed of play, a time of play, a color, music, a sound, multidimensional motif manager 205, avatar manager 210, scenes-a-faire manager 215, multidimensional display manager 220, pseudorandomizer 235, or cRPG display 240, as well as user interface 250 or remote interface 260. Although processing can be distributed among the managers, it also may be possible to employ cRPG manager 225 in a supervisory-like process. Each manager can be hardware, software, or a functional combination thereof, including firmware. In addition, functionality may not be strictly divided among manager elements but may overlap where practicable.

Single player and player versus player (PvP) games may be selected within MMORPGS 200. If a player selects a single-player game using cRPG manager 225, then an AI element of the software, which may be an element of cRPG manager 225, plays against the single player. On the other hand, a player may select a multiplayer game with cRPG manager 225, and may choose to join a society of other players, represented by the corresponding characters, or to play against the characters of other players. A player also may choose to form and play with multiple characters, cooperatively, as a cooperative society, as a match, as a duel, as a skirmish or as a campaign. Using cRPG manager 225, a player also may choose a cooperative setting or a combat-type setting, and further choose a skirmish—that is, a time- and scope-limited encounter with other characters, or choose a campaign—which may include many skirmishes with other, less combative encounters interspersed for replenishment, ally-forming, re-armament, nourishment, scouting, or another activity not associated with hostilities.

Another type of game choice can be a match-type game, such as capture-the-flag, strategic gamesmanship for domination, or cooperative accumulation of resources. An advantage of the embodiments herein includes the ability to create hybrid games, for example, a hybrid of a combat campaign in combination with a cooperative accumulation of resources. Topological and geologic features may be accessed by cRPG manager 225, and visualized on cRPG display 230. In this way, mountain ranges, buttes, valleys, dry washes, rivers, lakes and many other related motifs may be manipulated to form a custom virtual geography on which the game is played and visualized.

Figure 3:
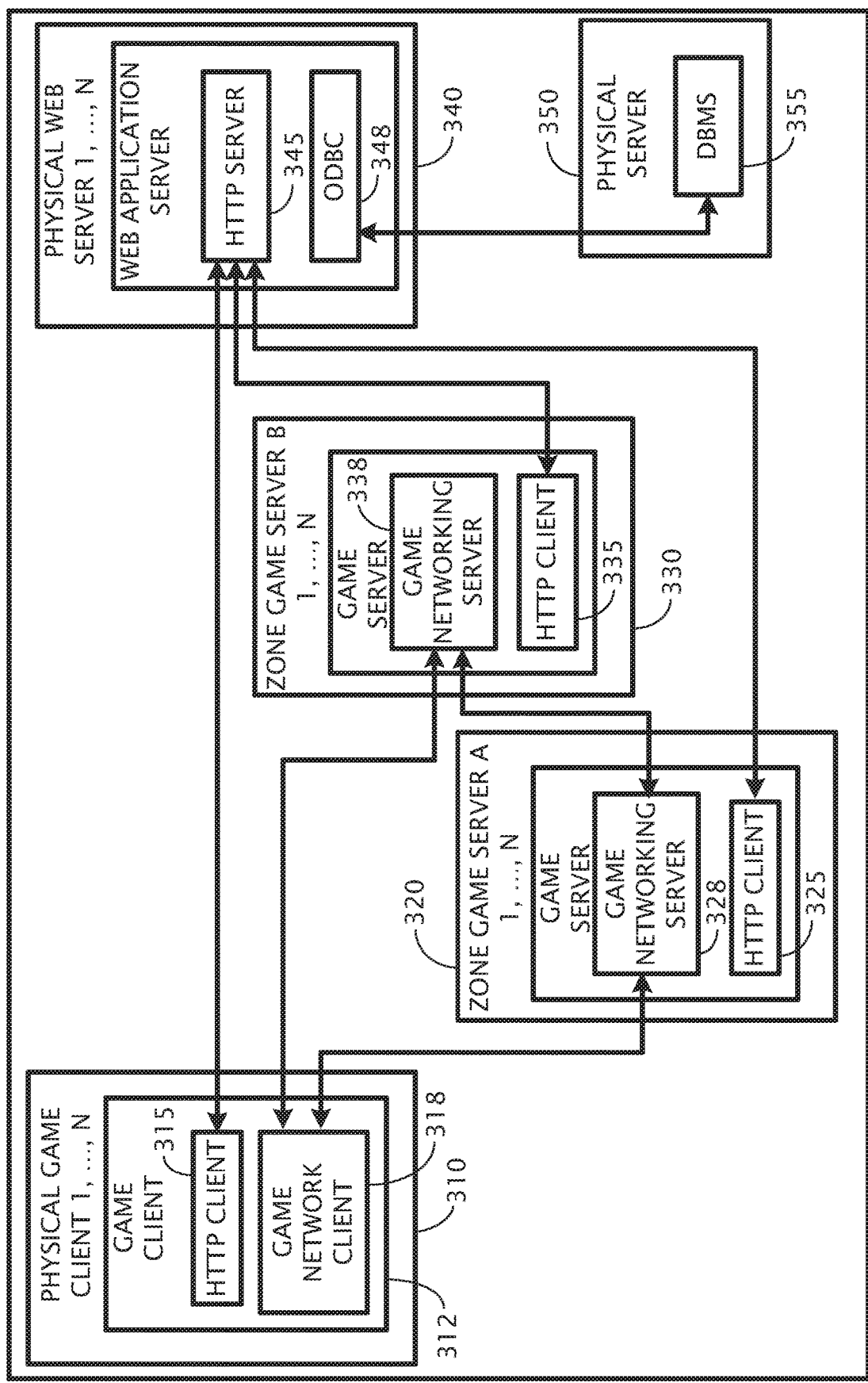
FIG. 3 is a block diagram of a zoned computing platform architecture of an embodiment, in accordance with the teachings of the present invention.

FIG. 3 is an example of MMORPGS 300, similar to MMORPGs 100, but using zoned or sharded computing and servers. For example, game client 310 can be communicatingly coupled to ZONE A game server 320 and ZONE B game server 330. Game clients 310 and game servers 320, 330 can be communicatingly coupled to HTTP server 345 of web server 340 by respective HTTP clients 315, 325, and 335. As before, Web application server 340 can include ODBC interface 348 to communicate with DBMS 355 of database server 350. Given an HTTP request, HTTP server Web server 340 can produce HTML pages, for example, that game servers 320 and game clients 310 can manipulate. Game network client 318 may be coupled to ZONE A game networking server 328 and ZONE B game networking server 338. One purpose of zoning could be to allow the virtual world of the MMORPGS to be split into to zones, so that activities in one part of the virtual game world can be handled by ZONE A server 320 and the other part of the virtual game world can be handled by ZONE B server 330. Alternatively, ZONE A server 320 could be used to interact with character motifs and motif manager of client 312 and Zone B could be used to interact with character activity and avatar-character manager of client 312, producing various character functions and motif changes. In a "geographic" split, ZONE A server 320 and ZONE B server 330 may cooperatively interact to allow handoff of client 312 character from one part of the virtual world to another. Of course, more than two shards may be used and, in view of the teachings herein, a person of ordinary skill in the art could foresee other purposes for multiple game servers 320, 330, multiple Web application servers 340 and, possibly, multiple database servers 355.

Present embodiments provide a method for multiuser computer-based role-playing that is both customizable and adaptable to customizations of an environmental entity, or a player entity, or both. In general, a player is a human involved in the cRPG. A player can manipulate one or more characters, each represented by an avatar. A functional operative can be a computer character or a manager player character, used to perform functional roles during a game. In addition to a character or a functional operative are motifs. Motifs are plural interactive entities that operate to provide a selected characteristic of a character, or of a virtual world in which the character is instantiated. A motif can include, without limitation, one or more of predetermined eras (with related motifs pertaining to era-related clothing, armaments, tools, weapons, and the like), scenes-a-faire, anthropological features, motivations, behaviors, cultural norms, collective behaviors, anti-social behavior, altruism, negotiation, empathy, treachery, antipathy, peacefulness or combativeness, interrelationships, habitats, habitations, habiliments, armamentaria, flora, fauna, environments, geospatial configurations (e.g., terrain, topography), temporo-spatial relationships, ambient weather conditions, environmental or behavioral rules, roles, or formats. Geospatial configurations (e.g., terrain, topography) may be depicted by a map, which may include, without limitation, representations of resource motifs, hydrology motifs, or established trails or roads. A character may be characterized by plural character-corresponding motifs within an environment. An environment also may be characterized by plural environs-corresponding motifs.

Also included are a character response (behavior or reaction) or an adaptation, of a character corresponding to an environmental entity modification. A character response or an adaptation, behavior or reaction of a character corresponding to an environmental entity modification can be dependent upon entities such as physical setting, social setting, or feedback, social interaction, behavior, negotiation, economics, policy or dialogue processes. A character response or adaptation can result from corresponding player interaction with the character, from character interaction with other characters in the cRPG, or as a result of predetermined behavior motifs established prior to or during a game.

Hereinafter, each cRPG characteristic can be designated as a "motif," and each motif itself may be constituted of one or more character or environmental entities, including ambient, behavioral, sociological, armament, habiliment, nourishment provisioning, temporospatial, hydrological, or geologic entities. A motif may represent a singular entity (e.g., hydrological—an isolated, shallow lake) or multiple entities (hydrological, thermal, and geologic—a deep alpine lake with thermal variations near a submerged hot spring). For example, a geologic motif may include daylight, topology, altitude, seismicity, volcanism, hydrologic features (lake, river, ocean), flora, or fauna. Similarly, a meteorological motif may include factors such as local or prevailing wind presence, speed or velocity, temperature, weather change, prevailing climate, humidity, and hydrologic features (mist, snow, hail, rain, flood). A motif may be interrelated with one or more other motifs: a player's avatar may represent an old man dressed in a loincloth located on a mountain ridge and the old man may react to hunger, fading daylight, increasing wind and decreasing temperature.

A reaction may be adaptive, for example, the old man engages in behaviors to seek shelter, safety, and warmth, for example, by interacting with another character such as to barter, purchase, borrow, or steal needed items, may interact with the computer, or may make his way to a desirable endpoint on his own. In the presence of other characters, perhaps strangers to the old man, an altruism motif may be used to determine a desired degree of altruism in the strangers relative to helping the old man and each other. Other motifs may include an ambience, a temporal (era), an anthropologic, an interaction style, a transport, a habitation, a cooperative or competitive behavior or toolset, an altruism, a health and welfare, a compassionate interaction, a resource distribution, seeking, or hoarding, or an offensive or defensive military motif.

Another motif may be a entity or set of behaviors corresponding to resource reuse, recycle, recovery, repurpose, or scavenging. Motifs can be used to customize a set of scenes-a-faire to create an environment, including "background" (e.g., NPC) characters, to match or contrast with an era motif: distant past, recent past, present, future, or fantastical motif. For example, the previously noted man in a loincloth may find himself in a modern-day megalopolis, which may cause him to behave differently than if he was placed in more rustic and rudimentary times, befitting his presumed "life experiences." Motifs, by their nature, can be multidimensional as well as multi-motif, including a 3-dimensional "physical" world, with other dimensions such as light, heat, color, or humidity. Such interaction and multi-dimensionality of motifs is a common feature of embodiments herein.

MMORPGS 200 can include local game servers, zoned or sharded game servers, and global game servers, with each hierarchical level interacting with another to provide continuity among players during play and as a player's character enters the functional domain of the respective server. Zoning of servers may be oriented by virtual world geography, by function, or by both. For example, management of a scenes-a-faire, a non-character player or an ambience may be divided into pertinent regions, using sharding or zoning in one or more game servers, whereas character-related motifs may be managed locally, for example, in a corresponding gaming client. Application of regionally-managed features can be applied locally to the character through interactions between the player game client and one or more regional or global gaming servers. Continuity of virtual world state over time and through virtual space can be called persistence. Persistence of the gaming environment is maintained by one or more coordinated database management systems, which may host states, variables, and collections of elements used to preserve the appearance of the virtual world among players, as they play, enter, or leave the gaming environment. Zoned material can be stored in basic and evolved form, illustrating original and current environmental states of the virtual world in each zone. To facilitate uniformity, zone data can be collected by web applications and stored in the centralized database. Distributed management facilitates flexibility and variety among characters, whereas selective centralization can facilitate continuity and stability of environment and maintainence of common elements through game clients, game servers, web applications, and database servers. Moreover, distributed management not only facilitates continuity for large group play, it also enables player-to-player action play within instances, relevant non-player character activity, or character movement across zones.

The following is an example of an altitude motif interacting with other motifs and a character to simulate a high-altitude city or mountainous region. In general, altitude affects environments, surroundings, flora, and fauna as well as a game character. Relative to a character, the higher the altitude of the player, the harder it is to breathe. A character may begin to suffer realistic, negative side effects, depending on how much oxygen it is able to inhale at the high altitude. Decreased oxygen at higher altitude, without supplementation, can result in a character exhibiting lower stamina, quickly drained energy, decreased body temperature, blurred vision, and ultimately death due to a lack of air. In a mountainous region with lower temperatures, higher winds, and harsh or snowy conditions, the negative effects on the character may be accelerated. Altitude effects or even altitude sickness may have a negative impact on a character to interact (e.g., to fight) with other characters. The character can be customized to be outfitted properly for such arduous conditions, such as customized to have oxygen on hand, or to have fantastical (superhuman) lungs, or may be less suitably outfitted, if the player customizes the character to endure, overcome, or perish in such an environment. Pseudorandomizer 235 may be used to introduce meteorological variations which may have a negative upon a character or characters, as well as environment and surroundings (e.g., water supply freezes). For example, the propensity of a geographic region for snowiness and the occurrence of an avalanche.

A similar geologic motif includes hydrology which also impacts environments and surroundings, as well as one or more characters and their habiliments. The hydrological motif of a region made be customized to form a pond, lake, river, or ocean. Floods may be selected as a chosen feature or may be an element chosen, for example, by the pseudorandomizer 235. However, hydrology may be an advantage or disadvantage. An area may be made prone to become a hostile feature when in contact with water. The more water is trapped in an area, the more likely it is to form mud. The mud can interact with temperature to form ice at freezing temperatures or below. As in the real world, one or more characters or certain transport motifs may slip, get stuck in mud, become trapped in or under ice, or be generally disabled. On the other hand, a transport motif may be customized to include transport mechanisms that are able to move through mud and ice and may float on water, when ice is broken through. As another example, in a land motif having an interactive hydrology motif, skillfulness of a player may help the corresponding character overcome hydrologic traps and hazards to the disadvantage of other players. In a deep water or ocean motif, a character may be provisioned with one or more air tanks to breathe under water for a preselected period. Characters may swim In any direction, however, the deeper the water, the greater the pressure, causing barometric injury to consciousness or body unless gradual descent and ascent, and proper oxygenation are employed. The ambient light in the underwater motif will become darker, ultimately if a character runs out of air or dive too deep losses a limb and can't swim, he or she will die unless someone gives them air or help to reach surface. Also, in deep water motifs, pseudorandomizer 235 can be used to cause an increased likelihood of encountering oceanic wild life [some passive, some aggressive] with positive or negative outcomes, depending upon the skill of the player to manage the corresponding character in the situations generated. For example, a character in a deep water motif may be hunted by a large predator and, in response, the player causes the character to hide in an undersea rock formation crevasse until the predator passes or loses interest. However, as air begins to get low, the player may cause the character to fight the predator with whatever tools given to the character by the player. Generally, the underwater ambience will become darker and colder with depth and time of day. Ultimately, a character will die unless another character gives them air or helps the character to reach surface. If player runs out of air or dive too deep losses a limb and can't swim, again, the character may die without altruistic intervention by one or more other characters. A player may use motif manager 205 and avatar/character 210 to make changes to improve survival chances on the fly, or may set a character's motif to have human or superhuman skills.

Meteorology, hydrology, and other outdoors elements can be environmental-type motifs, just as personal-type motifs may be constituted of character behavioral elements such as reactive behavior, adaptability, planning, compassion, hostility, cunning, stamina, physical strength, love, peacefulness, altruism, greed, anger, antipathy, and propensity for violence. Collective character behaviors also may be useful motifs including, without limitation, negotiation, gathering, hunting, shopping, worship, management, peacefulness, industry, propensity for violence, or emergent collective behavior patterns, whether reactive or adaptive. Character motif modifications can be achieved, for example, by use of the avatar-character manager 210 and may include the multidimensional motif manager 205.

For example, a character may be created from a far distant era motif, complete with a set of distant-era-appropriate tools, and placed in a modern-era society motif, with the goal of the distant-era character finding ways to integrate into modern society, based on skill of the corresponding human player. A character motif also could be drawn from a combination of current-era motif, and a fantastical or futuristic era, in which the character may exhibit non-human features (e.g., feet) and current era facial and torso features. Not only may individual characters be created, so may groups and societies, exhibiting defined collective behavior (e.g., military behavior or agrarian behavior), which may be relatively constant or which may be adaptive and emergent, as the realities of the virtual world changes. Such a customization may involve, without limitation, scenes-a-faire manager, avatar-character manager, multidimensional motif manager, user interface 250 and remote interface 260, using cRPG manager 225 to coordinate the motifs and managers. Again, pseudorandomizer 235 may be used to inject stochastic shifts in appearance, play, behavior, and stability of characters and the virtual world characteristics (e.g., rain, sun, cold).

An example of the interaction of virtual world characteristics may be seen in a desert. Deserts can have adverse effects on characters and equipment. For example, each character may be given an allotment of water prior to entering the desert. Desert heat will drain the water reserves of players and equipment, leading to heat-related failures. Relative to a character, water deprivation in a hot desert environment may cause the character to see a mirage or to hallucinate (for example, falsely visualize water, shelter, allies, or enemies). Without being able to distinguish mirage from reality, the character may get lost in the desert leading to additional plights. If the character enters the desert without boots or loses footwear, the character's well-being can rapidly deteriorate. Certain features such as shade, oases, and water can ameliorate the character's well-being or even offset the harm of the desert. However, a character is allotted a period of time after running out of water after which they can die. Night-time desert climates can be brutally cold and also may sap a character's energy and viability without the proper gear. Pseudorandomizer 235 can cause occasional sand storms to appear, reducing visibility, and potentially causing harm to the character's vision, as well as to vehicles and equipment held by the character. The character may act to avoid harm and impairment. Night time travel may be assisted by moonlight, ranging from a full moon to a new moon.

The availability of natural resources affects environments and surroundings, as well as a character, and may define wither a player lives or dies, as processed by a game server or, in some instances, the game client. Resources like food and water may help sustain a character. Other resources such as wood, metal, sand and other material can be used for construction of barriers, make-shift weapons, make-shift armor, shelter, buildings, and so on. Scenes-a-faire manager 215 can be used to allot basic resources and motif manager 205 may be used to increase or decrease the stock amount of resources. Such allocation and provisioning may be performed by a game server or by a client server, or may be cooperative among servers. When a resource is used, it will decrease until there is no more. On a map view, the gathering of resources will affect the map, wood gathering requires one to cut down a tree, getting water will deplete water, and mining rocks will break away rocks. Each reduction in feature may impact the appearance of the resource on a map. Resource gatherers may choose to consult the map for more distributed use of natural resources, or may choose to plunder the resources of an area—for example, if the resources belong to an opposing character.

Each motif interacts with respective characters and adapts with the evolving game, providing players with characters, features, and situations that provide life-like simulation, as well as, perhaps magical powers and fantastical features. Thus, fantasy battles such as Japanese Shoguns versus Norse Vikings can be realized, as well as present day war on terror within a modern-world setting. The remote interface 260 permits a player to join other players, sometimes en masse, for a massive multiplayer role playing game with gentle and combative groups of characters from many era, creating a virtual world perhaps similar but perhaps very foreign to life in today's world. Although each motif is interactive with others, not all motifs are necessarily used in a particular game. Pseudorandomizer 235 also may cause a change in behavior of a non-player character, a group, a race, a faction, or other subgroups of people. For example, a pastoral group of a docile race may begin to become increasingly hostile when faced with adversity, and may become a warrior clan contrary to the norms of their race.

Figure 4:
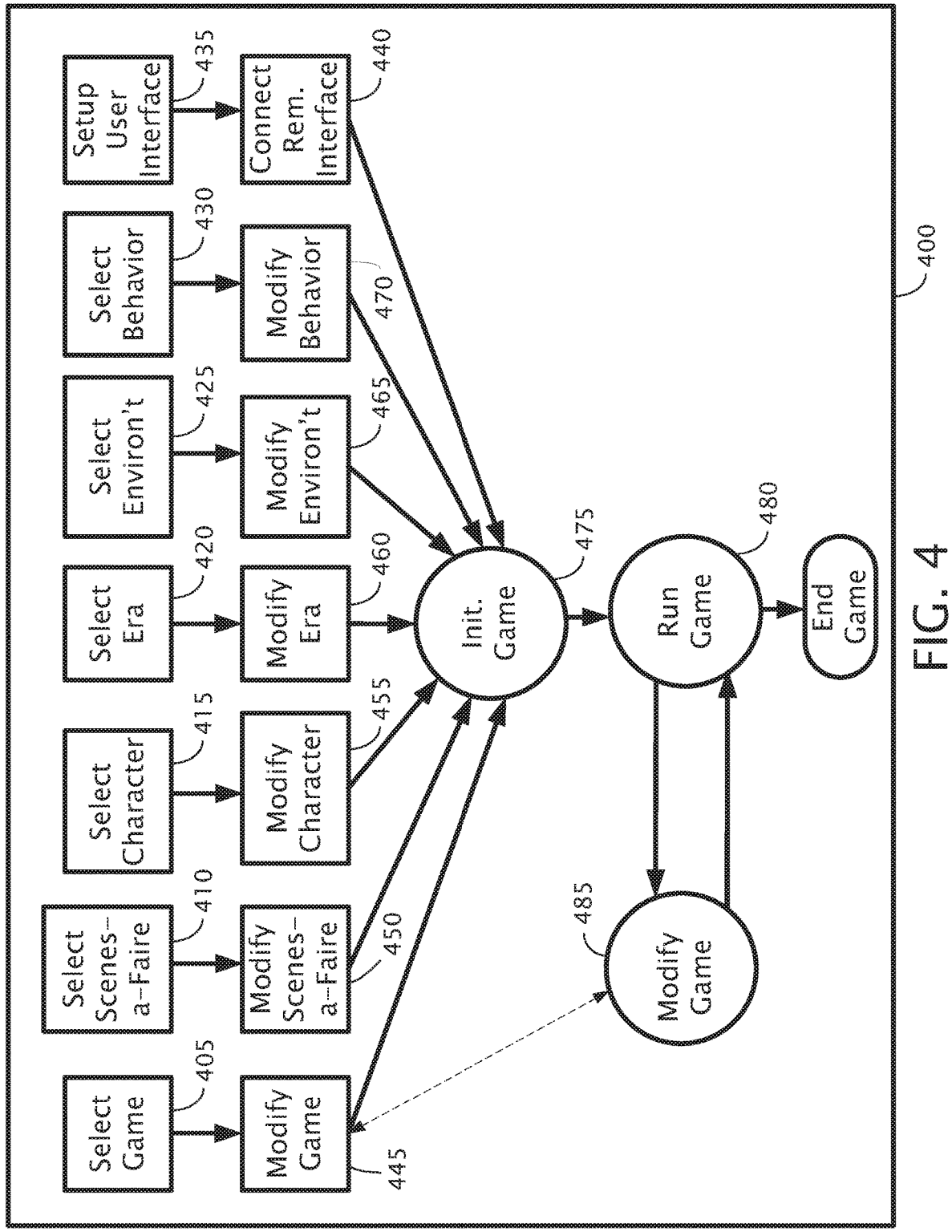
FIG. 4 is an example embodiment of a method for a customizable, adaptable, multiuser computer-based role playing online game from a first perspective, in accordance with the teachings of the present invention.

Turning to FIG. 4, a first generalized method 400 for engaging in a MMORPGS is presented. This method could be useful in a single-player mode of the MMORPG, where a player could roam free in a "sandbox" milieu. It also may be available to a Game Master player on a wider scale, establishing the initial or evolved characteristics of a corresponding MMORPG. A player or administrator may select a game 405, select scenes-a-faire for the game 410, select a character to play the game 415, select an era 420 in which the virtual world of the game is to be played, select an environment 425 or environments representative of the virtual world, select general behavior traits 430 for the character of the player and other characters in the virtual environments, set up the user interface 435 and, if external influence is expected, connect a remote interface 440. When these, among many, motifs selected, a player then may modify a game 445, modify scenes-a-faire for the game 450, modify a character to play the game 455, modify an era 460 in which the virtual world of the game is to be played, modify an environment 465 or environments representative of the virtual world, modify general behavior traits 470 for the character of the player and other characters in the virtual environments. Of course, the motifs and order of selection and modification provided herein are solely for example, and can be selected and modified after selection prior to commencement or during a game.

With the basic initial points of the game established, the game state may be initialized 475 and game play may occur by running the game 480, during which traits, behaviors, environmental conditions, and other environmental and character features evolve. Method 400 also accommodates modifying 485 a game on the fly to provide a different aspect of the virtual world, to revive a player, to add nourishment, armament, or challenges, as examples only. Player v. player functionality is provided to allow two players to spar or duel (PvP) independently of the evolution of the virtual world around them. Setting up the user interface 435 can be performed prior to game play, as can setting up 440 the remote interface. Modifying interfaces is possible during game play, as allowed by the respective interface hardware and software requirements.

Figure 5:
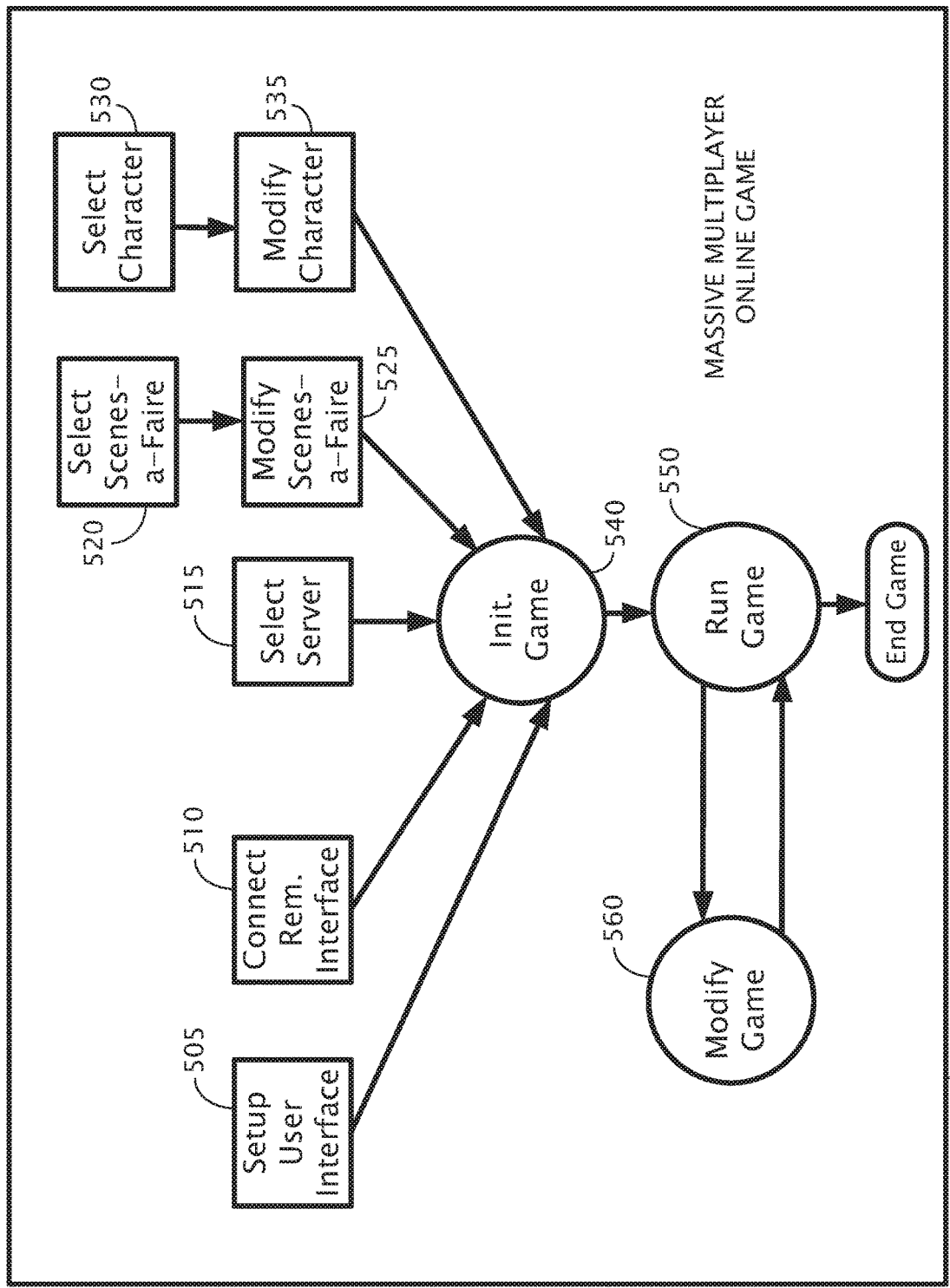
FIG. 5 is an example embodiment of a method for a customizable, adaptable, multiuser computer-based role playing online game from a second perspective, in accordance with the teachings of the present invention.

Turning to FIG. 5, a second generalized method 500 for engaging in a MMORPGS is presented. Method 500 is more often to be used in a massively multiplayer online milieu, in which the individual player generally has no capabilities of selection of era, environment, geography, climate, behaviors of NCPs and other characters. These facets tend to be controlled by the Game Master or other game administrator. A player's character may choose, or not, to join an adventure, battle, skirmish, collaborative effort, or expedition, which may be in progress in the MMORPG. Accordingly, the method of FIG. 5, includes setting up user interface 505, connecting remote interface 510, selecting game server 515, selecting predetermined scenes-a-faire 520 as allowed to the player/character, and selecting a preselected character 530. Also, modifying predetermined scenes-a-faire 525 and modifying predetermined motifs of a character 535 also may be features of the MMORPG. With the elements of the player's game participation thus prepared, the player then may advance into the game by initiating the character's role 540, and participating in the MMORPG 550. The player's skill at manipulating and adapting the corresponding character allows an extent of modifying the play of the game, which may be enhanced by adaptations in other characters behavior in response to the corresponding character's behavior.

MMORPGS Character Examples

MMORPGS characters of the present embodiments may be customized by interacting motifs corresponding to age, faction, race, gender, face, eye color, hair color, hair style, height, skin color and tone, and ears, managed by the avatar-character manager 210. Body habitus may be of a human-like being or may be a shape such as a snake, dragon, or other actual or fantasy creature. A male character can have a choice of facial and body hair, and a female can select hair length, nail type, bust size, etc. Colors and styles may be realistic or may be of an anime-style color or shape. Skin color can be a natural color, or may be gray, green, blue, lavender, etc. Muscles also may be individually customized such as muscles on arms, legs, chest, stomach, back. Other selectable features may include fantastical parts such as tails, wings, unnaturally-placed eyes, ears, and mouths as well as a scar or a tattoo, including appearance and placement. A player may select and adjust a character voice according to tone, pitch, animal or unnatural qualities. Certain stock races may be provided, although the player is free to customize a character or a race to fit personally-inspired criteria. For example, elves may look like humans with a height similar to or greater than that of a human. Elves may have pointed ears, which can be long and stretch back or be pointed back or be stretched up or pointed up. Instead their ears can be of medium length and pointed up and back, or have short ears which may be flat and face forward. Their skin may be a pale blue and the male elves can have large leg muscles enabling them to leap great distances.

Embodiments and implementations of the MMORPGS described herein can allow for substantial customization of character, which customization may have an impact on the character's behavior, adaptation, membership in a community, a guild, a race, or a faction. Easter eggs or exploits may be provided to allow metagaming or special access to awards, goods, and powers to be gained by superior players. An Easer egg personality type is provided for nconventional behavior—Easter egg type tends to also break character and grab the camera screen or press their face on the lens.

Typically, other MMOs communicate using typed or spoken language. In the present embodiments, it may be desirable to have both voice and typed text appear as a preselected language in a cartoon-like bubble near the speaking characters. That is, speech-to-text may be used to communicate with other users. Speech-to-text can allow players using different language to communicate for example via an automated translation module 275, into their native tongue on their display. A text-to-speech/speech-to-text module 270 also may be used to convert typed text to spoken native words of a player, further bringing multiple dimensions of audiovisual communication together. This may allow hands-free speech during action periods of game playing and typed text when speech is unnecessary or undesired (e.g., in a covert military operation). The selection of text, speech, native language, translation, or silent play are all options which may be selected by a player during initialization of a game 470 or during game modification 480. In typed speech, punctuation marks (e.g., ! or ?) can be used to inflect a player's voice as "spoken" by the player's character. Although the automated translation feature may be included in some embodiments, such is not required by all embodiments.

Cut scenes are provided. During a game, a cut scene follows like anime with cinematic feel. The player will see his or her character in the game cut scene. If the character has a selected personality type, the character will respond in the cut scene saying various lines fitting to the scene and selected personality.

Example MMORPGS Environment

An embodiment of the game consists of five continents, three of which are occupied by a character faction from which players initially may choose a character. There may be a northern continent, a western continent, a southern continent, a central continent, and an eastern continent. In general, the northern continent is inhabited by the futuristic and science fiction-based elves. This continent can be changed by the season but most locations are frozen due to the high latitude located In the north. The landscape consists of high cliffs with floating mountains and has numerous waterfalls, with water falling from the valleys. Characters that do not have supernatural powers selected for them, must prepare for freezing environments and base their behavior on the challenges presented by the "outside" temperature of this virtual continent. Because the pseudorandomizer 235 can act on the environmental motifs, snowstorms and ice flats may form and may change the territory and challenges faced by the character.

The western continent can be inhabited by a general human race who are highly adaptable as evidenced by their ranges of buildings—from simple straw houses to futuristic buildings—having a generally real-world western style. The western continent includes multiracial cities and towns, having a diversity of construction and custom and making each town and city unique. The western continent is usually flat and filled with meadows and fields overflowing with flowers, and can have high forests, but not jungles.

The central continent can be generally large with diverse landscape; some peaceful, some harsh and unfavorable. However such a large continent will have a diversity of other races and civilizations for which a payer may choose, which characters (through their corresponding players) may find and befriend or make war with a player's character, depending on the character's faction and their own preference.

The southern continent is primarily frozen all year round and is open to exploration. This continent environment is very unfavorable as it is almost always engulfed in a brutal snow storm. However this continent contains great secrets that will help players in the game greatly. When the storm clears, and the secrets emerge, it may be one of the continents worth admiring.

In general, the eastern continent is inhabited by a race of dragon-like people; their buildings are Asian styled in a mix of Chinese and Japanese buildings. The eastern continent characters are traditionalist, preferring the past ways and buildings which will not totally destroy the environment. The buildings and streets are styled in the Sengoku era of Japan or in a simple modern style. The world is changing but their races' cities are still unique even though they have been to forced to modernize. It contains a peaceful and meditative environment in rural areas as opposed to the chaotic cities where the other races live. Their continent landscapes are usually flat lands to snowy mountains and high cliffs. They have the most unique landscapes but, under the influence of the pseudorandomizer 235, may have extreme seasons and harmful storms. Spring usually brings rain and the eastern continent can be very peaceful and radiate a golden-like aura in morning skies. Sakura trees also bloom in eastern continent spring. Summer can generally be hot to extremely hot. When extremely hot, NPCs and characters may collapse from heat stress unless they find ways to cool off. Fall is the start of winter where characters (and their corresponding players) can see the leaves change and fall; the characters can feel the weather cooling down, and undertake behaviors to remain warm. In winter, snow falls and Is usually the time where people take hot spring baths or sit in rooms warmed by kotatsu. Despite seeming peaceful, the eastern continent is prone to storms, monsoonal rains, and sometimes even typhoons. This race does have cities but is not always modern however this race will display a form of "golden" city or a past paradise.

In general, all capital cities on each continent contains a single large science-fiction-style cylinder tower which expands greatly to the sky, this tower is the terminal in which ships from other locations may dock and unload passengers and goods. The terminal is enormous and can be seen on the outskirts of the city, maybe even further. The terminal draws tremendous power from elemental ores which are condensed elements; or elements in stone form, which are produced by simply condensing elements. All races use elemental ores In one way or another. The ores are universal and can power anything from simple appliances and electronics to high-end flying ships and great terminal towers. There is no pollution in city due to the world powered by the elemental ores. The ores do not have any side effect. It can be used up like fuel but the ores will need to be created; as such will deplete the world supply. Each race has a solution to this. The Dragon of the east continent will ask their dragon warden or gods for access to realms which generates the ore elements, the northern elves may use alchemy to find a way to disregard the rules of equivalent change, the western human race must choose to steal or work as a mercenary group to factions in return for ores as pay. Ores are used to barter for other goods, to produce energy, to be a cause of struggle for power, or to use as peace offerings. Ore reserves can be displayed on a map on a near-real time basis, showing the depletion in one region, and causing expeditions in search of ore in other regions. Other goods of merit can be weapons and armaments, clothing, foodstuffs, protective gear, fuel, medical gear, and communication equipment. Ores and goods of merit can be the focus of cooperation, community interplay or war, or merit awards.

Wounded characters maybe healed using medical gear, food, warmth, and a supportive environment. Insufficient supply of any of these may retard recovery and cause a character to be unable to play to full capacity. Each of these may be motifs under the control of a player client, server, zone server, or global server. Many other scenarios can be proposed and described but the availability of multiple motifs, applied in a circumstance-appropriate manner, in accordance with programmed rules of the game, allow for a panoply of different scenarios, situations, character, and interactions.

Although the present invention has been described by way of example with references to the circuit drawings, it is to be noted herein that various changes and modifications will be apparent to those skilled in the art. Therefore, unless such changes and modifications depart from the scope of the present invention, they should be construed as being included therein.

The invention claimed is:
1. A user gaming device, comprising:
a single player game interacting with a cRPG manager, wherein the cRPG manager creates a virtual reality zone in which the single player game is played by a single player, wherein the cRPG manager includes an artificial intelligence module coupled to a virtual world database and configured to produce at least one game character having a behavior and to engage at least one game character in a preselected relationship with the single player; and a pseudorandomizer coupled to the cRPG manager, the pseudorandomized configured to instigate a pseudorandom change in the behavior of the at least one game character.

2. The user gaming device of claim 1, further comprising a plurality of cooperating virtual reality zones corresponding to at least a portion of a virtual world represented in the virtual world database; and an HTTP client coupled to the cRPG manager, wherein the HTTP client communicates Web-based data with the Internet.

3. The user gaming device of claim 2, wherein an at least one game character response can adapt from corresponding player interaction with the single player.

4. The user gaming device of claim 3, wherein the cRPG manager participates in distributed management to facilitate the single player movement among respective zones.

5. The user gaming device of claim 4, further comprising a user interface coupled to the single player game and having at least one of:
- a mass sensor;
- an accelerometer;
- a haptic device;
- a first device for visual input or visual output, or both;
- a second device for audio input or audio output, or both;
- a tactile sensor or a tactile effector or both.

6. The user gaming device of claim 4, wherein the preselected relationship is a rival.

7. The user gaming device of claim 4, wherein the preselected relationship is an ally.

8. The user gaming device of claim 4, wherein the preselected relationship is a member of a cooperative society.

9. The user gaming device of claim 5, wherein the single player engages in an activity, wherein the activity is a real-time, an interactive, and an adaptive virtual world activity.

10. The online game apparatus of claim 9, further comprising an automatic speech recognizer, coupled to the cRPG manager, causing the single player game to interact with the virtual world database in response to recognized speech.

11. The user gaming device of claim 10, further comprising a handheld control module.

* * * * *